2,786,937
BULB MOUNTING FOR HEADLAMP REFLECTOR

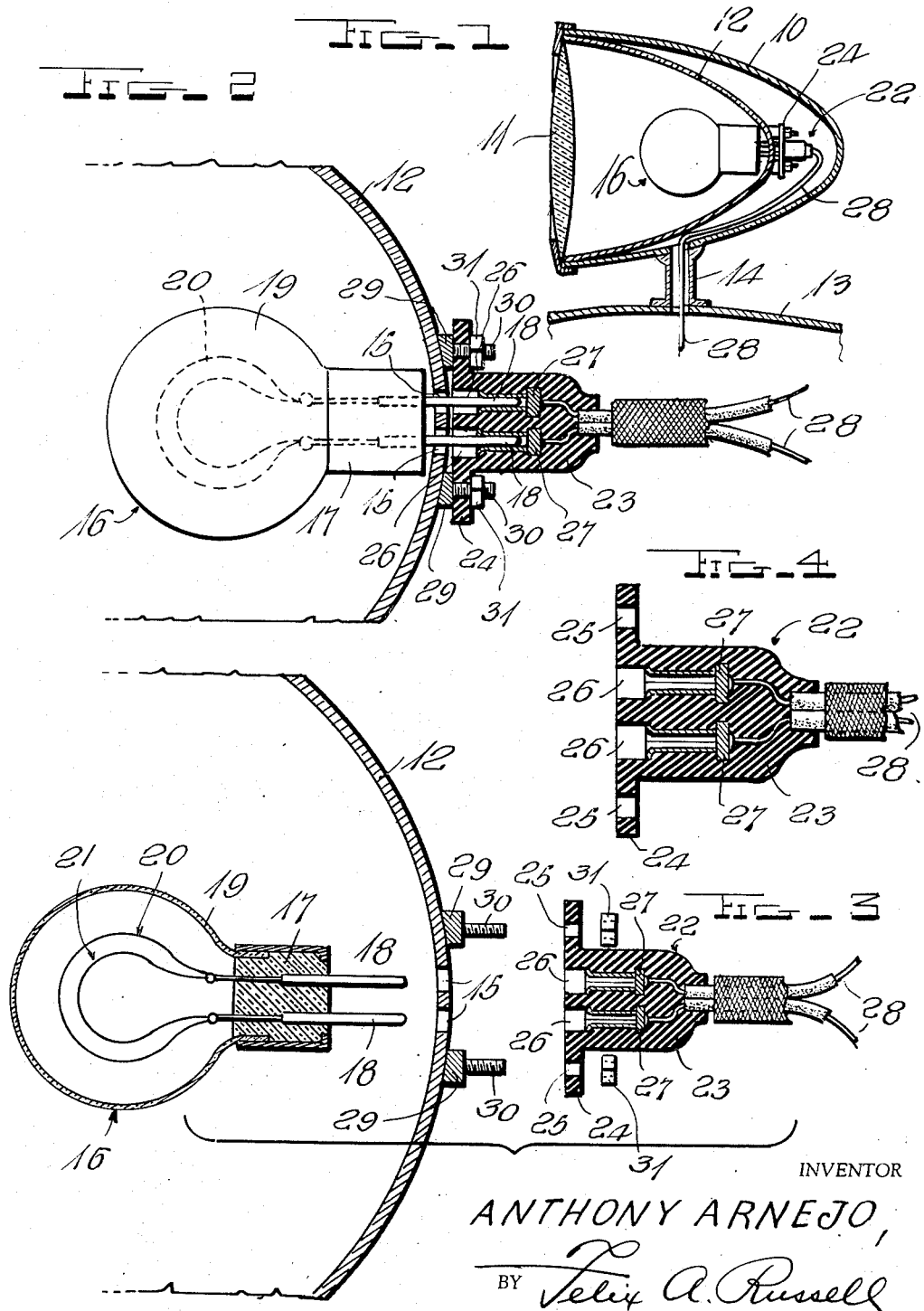

Anthony Arnejo, Detroit, Mich.

Application September 26, 1952, Serial No. 311,703

1 Claim. (Cl. 240—41)

The present invention relates to a foglight bulb and mounting therefor and it consists in the combinations, constructions and arrangements of parts herein described and claimed and is an improvement over my invention shown in my copending application, Serial No. 310,299, filed September 18, 1952.

Generally the present invention comprises a novel fog lamp especially designed for use in automobiles and means whereby the same may be quickly and easily attached to or removed from an automobile headlamp structure. One novel feature of the invention is the provision of a socket structure which may be quickly and inexpensively affixed to the rear face of the inner portion of a conventional reflector and which, once so mounted, is adapted to receive therein a pair of contact pins forming a part of the fog lamp.

It is accordingly an object of the invention to provide a novel fog lamp for automotive vehicles.

Another object of the invention is to provide a novel mounting for the removable reception therein of said lamp.

Still another object of the invention is to provide, in a device of the character set forth, novel means for affixing to the rear of a conventional reflector a novel socket forming a part of the invention.

A further object of the invention is the provision therein of novel brackets forming a part of the invention.

Another object of the invention is to provide a device of the character set forth which is simple in construction, inexpensive to manufacture and yet effective and efficient in use.

Other and further objects of the invention will become apparent from a reading of the following specification taken in conjunction with the drawing, in which:

Figure 1 is a reduced vertical sectional view of an embodiment of the invention, Figure 2 is an enlarged fragmentary vertical sectional view, partly broken away, of the device illustrated in Figure 1, Figure 3 is a view similar to Figure 2 but showing the same in exploded condition, and Figure 4 is a further enlarged vertical sectional view of a socket forming a part of the invention.

Referring more particularly to the drawing, there is shown therein an automobile headlamp structure including a lamp housing 10 having a lens 11 in the forward end thereof and provided with a reflector 12 which is in spaced relation to the interior walls of the housing 10. The housing 10 is mounted upon, for example, a fender 13 of an automobile by means of a mooring post 14.

Referring now more particularly to Figures 2 and 3, it will be seen that there is provided in the rear end portion of the reflector 12 a pair of openings 15 and that a fog lamp generally designated at 16 is provided with a base 17 of dielectric material.

Embedded in the base 17 and projecting rearwardly therefrom is a pair of contact pins 18 and the forward side of the base 17 has affixed thereto a hollow lamp body 19 of glass or the like and containing therein a pair of filaments 20 and 21 each of which has its ends extending into the base 17 where they are respectively attached to the inner ends of the pins 18. The filaments are each adapted to give off a bright light when activated by an electrical current.

The outer surface of the body is coated with a paint by spraying the same thereon and thereafter baking the same, the paint being of a proper color to produce the conventional amber color when the filaments are lighted. Alternatively, the body 19 may be formed of an amber colored glass.

A socket generally indicated at 22 comprises a body 23 of dielectric material having a pair of diametrically opposed integrally formed ears 24 at the forward end thereof, each of said ears being apertured as shown at 25. Extending into the body 23 from the forward end thereof is a pair of channels 26 and, at the inner end of each channel there is embedded in the body 23 a contact plate 27. Each of the plates 27 has affixed thereto one end of a lead wire 28 and such wires extend between the housing 10 and reflector 12 through the post 14 to a source of electrical energy.

Affixed by welding to the rear face of the reflector 12 at either side of the openings 15 is a bracket 29 and to each bracket 29 is welded the inner end of a rearwardly projecting screw 30. The screws are each provided with a nut 31.

In assembling the socket 22, the brackets 29 are first welded to the reflector 12 and the screws 30 then welded to the brackets. Thereupon the screws 30 are extended through the openings 25 in the ears 24 and the nuts 31 tightened thereon. The contact pins 18 of the lamp may now be inserted through the openings 15 and thence into the channels 26 so that they may come into contact with the plates 27. Thus it will be apparent that a lamp 16 may be removed or replaced very simply. The channels 26 are so aligned with the openings 15 as to properly align the contact pins 18 in the openings 15 that no contact is made between the same and the sides of such openings 15.

While but one form of the invention has been shown and described herein, it will be readily apparent to those skilled in the art that many minor modifications may be made without departing from the spirit of the invention or the scope of the appended claim.

It will be further understood that the bulb and mounting of the present invention may be positioned in practice upon the upper or lower portions of the walls of the headlight reflector and may be used in conjunction with a conventional white light-emitting bulb in such reflector.

What is claimed is:

A device of the character described comprising, in combination with a reflector of an automobile headlamp having a pair of openings through the rear portion thereof, the provision of a socket member having a pair of channels therein adapted to register with the openings in said reflector, a pair of contact plates embedded in said socket member at the inner ends of said channels, lead wires extending rearwardly through said socket member and each attached to one of said plates, and means for attaching said socket member to the rear of said reflector, said means comprising a pair of brackets welded to the rear of said reflector adjacent the openings therein, a pair of screws welded to the brackets and extending rearwardly therefrom, a pair of ears formed integrally with said socket member and each having an aperture therethrough for the reception of one of said screws, and a nut for each of said screws.

References Cited in the file of this patent

UNITED STATES PATENTS

| | | |
|---|---|---|
| 479,322 | Wollensak | July 19, 1892 |
| 711,532 | Rooney | Oct. 21, 1902 |
| 802,052 | Marshall | Oct. 17, 1905 |
| 1,445,120 | Wise | Feb. 13, 1923 |
| 1,695,465 | Neuner | Dec. 18, 1928 |
| 1,898,295 | Douglas | Feb. 21, 1933 |
| 1,946,197 | Douglas | Feb. 6, 1934 |
| 2,139,374 | Michel et al. | Dec. 6, 1938 |
| 2,318,311 | Hicks | May 4, 1943 |

FOREIGN PATENTS

| | | |
|---|---|---|
| 111,629 | Great Britain | Dec. 6, 1917 |